(12) United States Patent
Breger et al.

(10) Patent No.: US 8,080,184 B2
(45) Date of Patent: Dec. 20, 2011

(54) POSITIVE ELECTRODE MATERIAL FOR A LITHIUM ION ACCUMULATOR

(75) Inventors: Julien Breger, Bordeaux (FR); Frederic Castaing, Gradigan (FR); Philippe Biensan, Carignan de Bordeaux (FR); Jessica Bains, Bordeaux (FR); Laurence Croguennec, St Selve (FR); Claude Delmas, Pessac (FR); Stephane Levasseur, Brussels (BE)

(73) Assignees: Saft, Bagnolet (FR); Centre National de la Recherche Scientifique, Paris (FR); Umicore, Brussels (BE)

( * ) Notice: Subject to any disclaimer, the term of this patent is extended or adjusted under 35 U.S.C. 154(b) by 113 days.

(21) Appl. No.: 12/571,804

(22) Filed: Oct. 1, 2009

(65) Prior Publication Data
US 2010/0108939 A1 May 6, 2010

(30) Foreign Application Priority Data
Oct. 24, 2008 (FR) .................. 08 05938

(51) Int. Cl.
*H01B 1/08* (2006.01)
(52) U.S. Cl. ................... 252/521.2; 429/218.1
(58) Field of Classification Search ......... 252/521.2; 429/218.1, 223, 224
See application file for complete search history.

(56) References Cited

U.S. PATENT DOCUMENTS

| 5,718,989 A * | 2/1998 | Aoki et al. ............. 429/223 |
| 6,274,272 B1 * | 8/2001 | Peres et al. ............ 429/231.1 |
| 2004/0053133 A1 * | 3/2004 | Li ........................ 429/231.1 |
| 2005/0014065 A1 | 1/2005 | Jung et al. |
| 2010/0320972 A1 * | 12/2010 | Tessier et al. ............ 320/137 |

FOREIGN PATENT DOCUMENTS

| EP | 1 523 052 A2 | 4/2005 |
| FR | 2860922 A1 | 4/2005 |
| JP | 2005-089225 A | 4/2005 |
| JP | 2005-150102 A | 6/2005 |

OTHER PUBLICATIONS

Shangyun Ye et al., "Al, B, and F doped $LiNi_{1/3}Co_{1/3}Mn_{1/3}O_2$ as cathode material of lithium-ion batteries", Journal of Solid State Electrochemistry, Current Research and Development in Science and Technology, Nov. 21, 2006, pp. 805-810, vol. 11, No. 6.

Shao-Kang Hu et al., "Effect of Co content on performance of $LiAl_{1/3-x}Co_xNi_{1/3}Mn_{1/3}O_2$ compounds for lithium-ion batteries", Journal of Power Sources, 2006, pp. 1287-1293, vol. 160.

* cited by examiner

*Primary Examiner* — Mark Kopec
(74) *Attorney, Agent, or Firm* — Sughrue Mion, PLLC

(57) ABSTRACT

A compound of formula $Li_{1+x}(Ni_aMn_bCo_cAl_y)_{1-x}O_2$ wherein: a, b and c are non-zero; $a+b+c+y=1$; $1.05 \leq (1+x)/(1-x) \leq 1.25$; $0.015 \leq y(1-x)$; and the atomic amount of manganese representing from 95% to 100% of the atomic amount of nickel.

15 Claims, 10 Drawing Sheets

| $a_{hex}$ (Å) | $c_{hex}$ (Å) | V (Å$^3$) | Ni interlayer | $R_{wp}$ (%) | $R_B$ (%) |
|---|---|---|---|---|---|
| 2.8634(2) | 14.245(2) | 101.15(2) | 0.021(7) | 13.9 | 3.52 |

Figure 5a)    Example 7 - Umin = 2.5 V
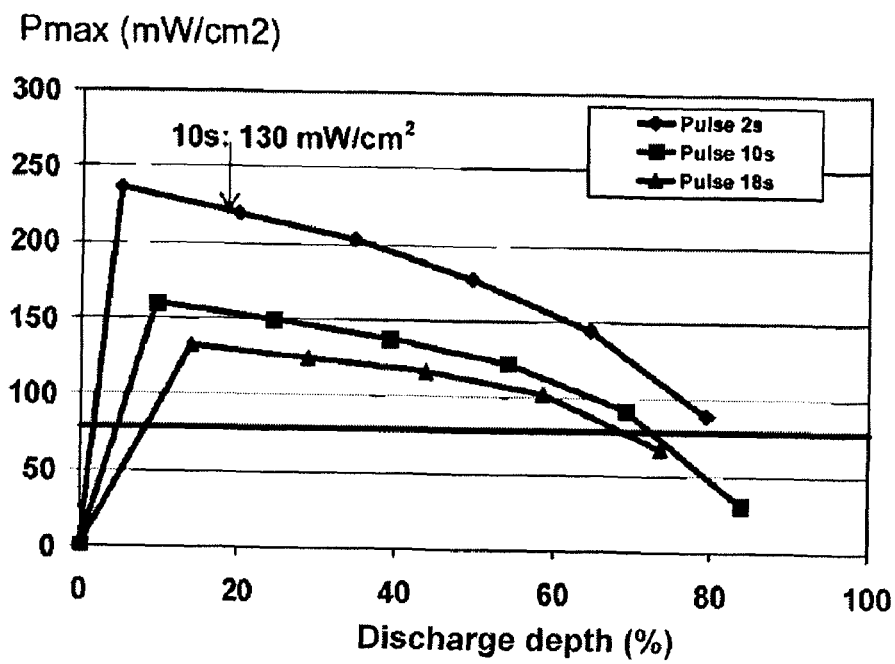
Example 11 – Umin = 2.5 V
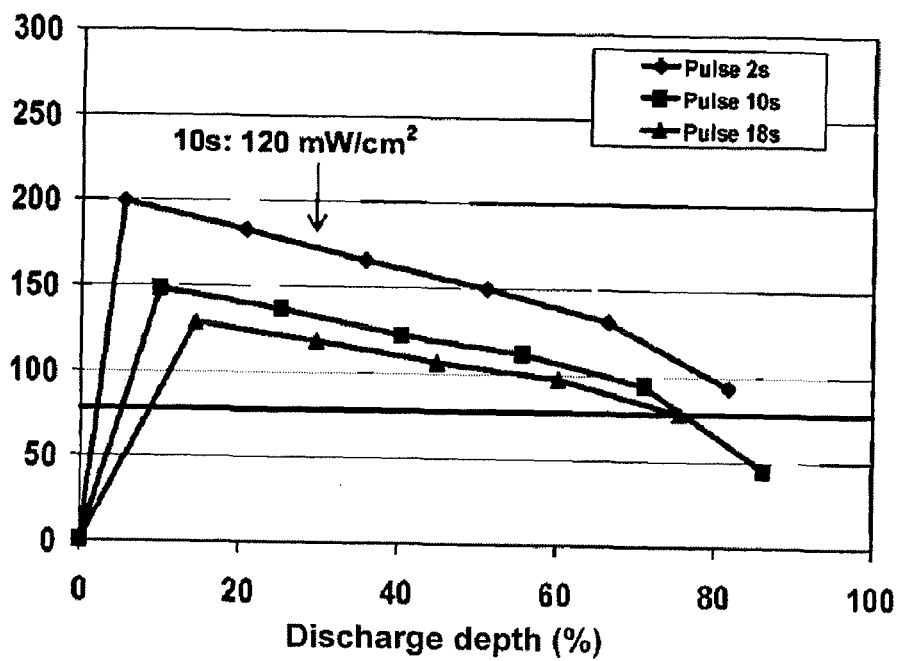

| Material | $Li_{1.01}(Ni_{0.425}Mn_{0.425}Co_{0.10}Al_{0.05})_{0.99}O_2$ | | | |
|---|---|---|---|---|
| Li/M | 1.02 | | | |
| Precalcination | 500°C/5h/air | 500°C/5h/air | 500°C/5h/air | 500°C/5h/air |
| (direct) heat treatment | 900°C 15min/air | 900°C 1h/air | 900°C 15min/air | 900°C 1h/air |
| XRD data | $FWHM_{(003)}=0.20°$ $FWHM_{(104)}=0.37°$ $I_{(003)}/I_{(104)}=0.84°$ | $FWHM_{(003)}=0.17°$ $FWHM_{(104)}=0.36°$ $I_{(003)}/I_{(104)}=0.91°$ | $FWHM_{(003)}=0.12°$ $FWHM_{(104)}=0.28°$ $I_{(003)}/I_{(104)}=0.70°$ | $FWHM_{(003)}=0.12°$ $FWHM_{(104)}=0.25°$ $I_{(003)}/I_{(104)}=0.68°$ |
| Structural parameters | $a_{hex}=2.8879(6)Å$ $c_{hex}=14.293(4)Å$ $V=103.24(4)Å^3$ $R_{wp}=15.2\%$ | $a_{hex}=2.8889(5)Å$ $c_{hex}=14.298(4)Å$ $V=103.34(4)Å^3$ $R_{wp}=15.7\%$ | $a_{hex}=2.8865(5)Å$ $c_{hex}=14.297(4)Å$ $V=103.16(3)Å^3$ $R_{wp}=11.6\%$ | $a_{hex}=2.8889(6)Å$ $c_{hex}=14.307(3)Å$ $V=103.41(3)Å^3$ $R_{wp}=13.8\%$ |
| XRD detected impurity | Spinel type (characteristic peak around 30° (2θ)) | Spinel type (characteristic peak around 30° (2θ)) | Mixtures of lamellar phases | Mixtures of lamellar phases |
| SEM |  |  |  |  |

Figure 6: Summary of the synthesis and of physico-chemical properties of Example 5 (comparative).

| Material | $Li_{1.06}(Ni_{0.40}Mn_{0.40}Co_{0.10}Al_{0.10})_{0.94}O_2$ | | |
|---|---|---|---|
| Li/M | 1.13 | | |
| Precalcination | 500°C/ 5h/air | 500°C/ 5h/air | 500°C/ 5h/air |
| heat treatment (2°C/min) | 900°C 12h/air | 950°C 12h/air | 1000°C 12h/air |
| XRD data | $FWHM_{(003)}$ =0.16°<br>$FWHM_{(104)}$ =0.23°<br>$I_{(003)}/I_{(104)}$ =0.92° | $FWHM_{(003)}$ =0.12°<br>$FWHM_{(104)}$ =0.15°<br>$I_{(003)}/I_{(104)}$ =0.91° | $FWHM_{(003)}$ =0.12°<br>$FWHM_{(104)}$ =0.13°<br>$I_{(003)}/I_{(104)}$ =0.97° |
| Structural parameters | $a_{hex}$ = 2.8724(3)Å<br>$c_{hex}$ = 14.264(4)Å<br>V= 101.93(2) Å$^3$<br>$R_{wp}$ = 11.9% | $a_{hex}$ = 2.8746(2)Å<br>$c_{hex}$ = 14.275(1)Å<br>V= 102.17(1) Å$^3$<br>$R_{wp}$ = 11.8% | $a_{hex}$ = 2.8766(2)Å<br>$c_{hex}$ = 14.285(2)Å<br>V= 102.37(2) Å$^3$<br>$R_{wp}$ = 14.3% |
| XRD detected impurity | No | No | No |
| SEM | 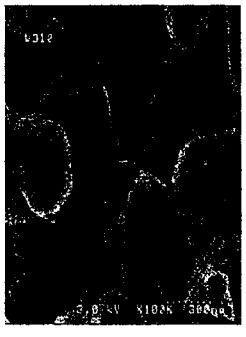 | 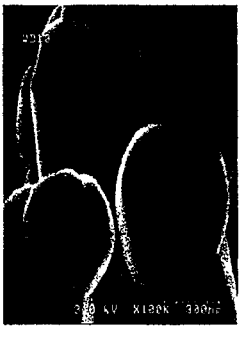 |  |

Figure 7: Summary of the synthesis of physico-chemical properties of Example 6.

| Material | $Li_{1.038}(Ni_{0.40}Mn_{0.40}Co_{0.18}Al_{0.02})_{0.962}O_2$ | | $Li_{1.038}(Ni_{0.40}Mn_{0.40}Co_{0.15}Al_{0.05})_{0.962}O_2$ | |
|---|---|---|---|---|
| Li/M | 1.08 | | 1.08 | |
| Precalcination | 500°C/ 5h/air | 500°C/ 5h/air | 500°C/ 5h/air | 500°C/ 5h/air |
| Heat treatment | 950°C 12h/air (2°C/min) | 950°C 2h/air (direct) | 950°C 12h/air (2°C/min) | 950°C 2h/air (direct) |
| XRD data | $FWHM_{(003)}=0.13°$ $FWHM_{(104)}=0.14°$ $I_{(003)}/I_{(104)}=1.07$ | $FWHM_{(003)}=0.16°$ $FWHM_{(104)}=0.19°$ $I_{(003)}/I_{(104)}=0.98$ | $FWHM_{(003)}=0.10°$ $FWHM_{(104)}=0.16°$ $I_{(003)}/I_{(104)}=1.13$ | $FWHM_{(003)}=0.18°$ $FWHM_{(104)}=0.20°$ $I_{(003)}/I_{(104)}=0.93$ |
| Structural parameters | $a_{hex}=2.8782(3)Å$ $c_{hex}=14.280(2)Å$ $V=102.44(4) Å^3$ $R_{wp}=13.1\%$ | $a_{hex}=2.8782(3)Å$ $c_{hex}=14.277(2)Å$ $V=102.42(2) Å^3$ $R_{wp}=13.0\%$ | $a_{hex}=2.8695(2)Å$ $c_{hex}=14.265(1)Å$ $V=101.72(2) Å^3$ $R_{wp}=12.2\%$ | $a_{hex}=2.8693(2)Å$ $c_{hex}=14.257(2)Å$ $V=101.65(4) Å^3$ $R_{wp}=12.0\%$ |
| XRD detected impurity | No | No | No | No |
| SEM | | | | |

Figure 8: Summary of the synthesis and of physical-chemical properties of Examples 2 and 3.

POSITIVE ELECTRODE MATERIAL FOR A LITHIUM ION ACCUMULATOR

FIELD OF THE INVENTION

The technical field of the invention is that of electrochemically active materials used in the manufacturing of positive electrodes (or cathodes) of rechargeable electrochemical generators (or accumulators) with lithium.

PRIOR ART

Lithiated oxides of transition metals are known as an active cathode material which may be used in lithium rechargeable generators. In the positive electrode, lithiated oxides of transition metals of general formula $LiMO_2$ are generally used as an electrochemically active material, wherein M is most often Mn, Ni or Co, and their substituted derivatives. For example, as an active cathode material, mention may be made of the compound $Li(Ni_{0.8}Co_{0.15}Al_{0.05})O_2$, which is a lithiated oxide of nickel-cobalt-aluminum. This material, further called NCA (nickel-cobalt-aluminum), is present in the positive electrode of lithium rechargeable generators used for industrial application, such as electric hybrid vehicles and space applications.

This type of active material however does not have sufficient heat stability. Indeed, in the case of overloading or accidental short-circuiting of the generator, a significant and sudden rise in temperature occurs, due to an exothermic reaction of the active material with the electrolyte. Given that most materials have a very unstable structure, overheating causes degradation of these active materials. Insufficient heat stability of these positive electrode materials poses a safety problem when they are used in small generators intended to provide strong currents (power elements).

Much work has attempted to improve the characteristics of the cathode active material $LiNiO_2$ which has strong heat instability. Among the solutions considered for stabilizing the structure $LiNiO_2$ during insertion/deinsertion of lithium, the substitution of a portion of the nickel with other less reactive elements such as manganese and aluminum, has frequently been retained.

Document FR-A-2 860 922 describes an electrochemically active material resulting from the substitution of a portion of the nickel of a mixed monophasic oxide of nickel and lithium of the $LiNiO_2$ type with elements such as Al, B, Ga, Mg, Zn, Fe, Cu, Ti, Zr, V, Ga and Si. It is stated that this material has improved heat stability. However, the electrochemical capacity of the materials described in this document is insufficient. An electrochemically active material is therefore sought which has higher electrochemical capacity than that of the materials described in FR-A-2 860 922 while retaining high heat stability.

SUMMARY OF THE INVENTION

The object of the invention is a compound of formula $Li_{1+x}(Ni_aMn_bCo_cAl_y)_{1-x}O_2$ wherein:
- a, b and c are non-zero;
- a+b+c+y=1;
- $1.05 \leq (1+x)/(1-x) \leq 1.25$;
- $0.015 \leq y(1-x)$;
- the atomic amount of manganese representing from 95% to 100% of the atomic amount of nickel. This compound is used as an active electrode material.

According to an embodiment, the amount of manganese representing from 97% to 100% of the amount of nickel, preferably from 98% to 100% of the amount of nickel still preferably from 99% to 100% of the amount of nickel.

According to an embodiment, $0.02 \leq y(1-x)$.
According to an embodiment, $0.04 \leq y(1-x)$.
According to an embodiment, $0.09 \leq y(1-x)$.
According to an embodiment, $1.05 \leq (1+x)/(1-x) \leq 1.15$.
According to an embodiment, $1.05 \leq (1+x)/(1-x) \leq 1.10$.
According to an embodiment, a=b=0.5−z; c=2z−y; and $0 < z \leq 0.15$
According to an embodiment, $0 < z \leq 0.10$.
According to an embodiment, $0 < z \leq 0.075$.
According to an embodiment, the compound is devoid of $Mn^{3+}$ ions.

The object of the invention is also an electrode comprising the compound according to the invention. According to an embodiment, the electrode is a positive electrode for a lithium accumulator.

The object of the invention is also a lithium accumulator comprising at least one positive electrode comprising this compound.

The compound, object of the invention, has higher electrochemical capacity than that of the materials of the prior art while retaining good heat stability. This material has good electrochemical power performances at 30° C. and at −20° C.

SHORT DESCRIPTION OF THE FIGURES

FIG. 1 illustrates the results of DSC measurement tests of the compounds of Examples 8, 9, 10 and 11 described in Table 1. In the Examples 8, 9 and 10, a=b=0.425. The tests are carried out on non-washed electrodes after a cycle between 2 and 4.5 Volts and C/20 charging rate (screwable Swagelok stainless steel cell, 88% of active material, 10% carbon, 2% PTFE).

FIG. 2 illustrates the results of DSC measurement tests of the compounds of Examples 1, 3, 4 and 11 described in the Table 1. In the Examples 1, 3 and 4, a=b=0.40. The tests are carried out on non-washed electrodes after a cycle between 2 and 4.5 Volts and C/20 charging rate (screwable Swagelok stainless steel cell, 88% of active material, 10% carbon, 2% PTFE).

Figure 1:
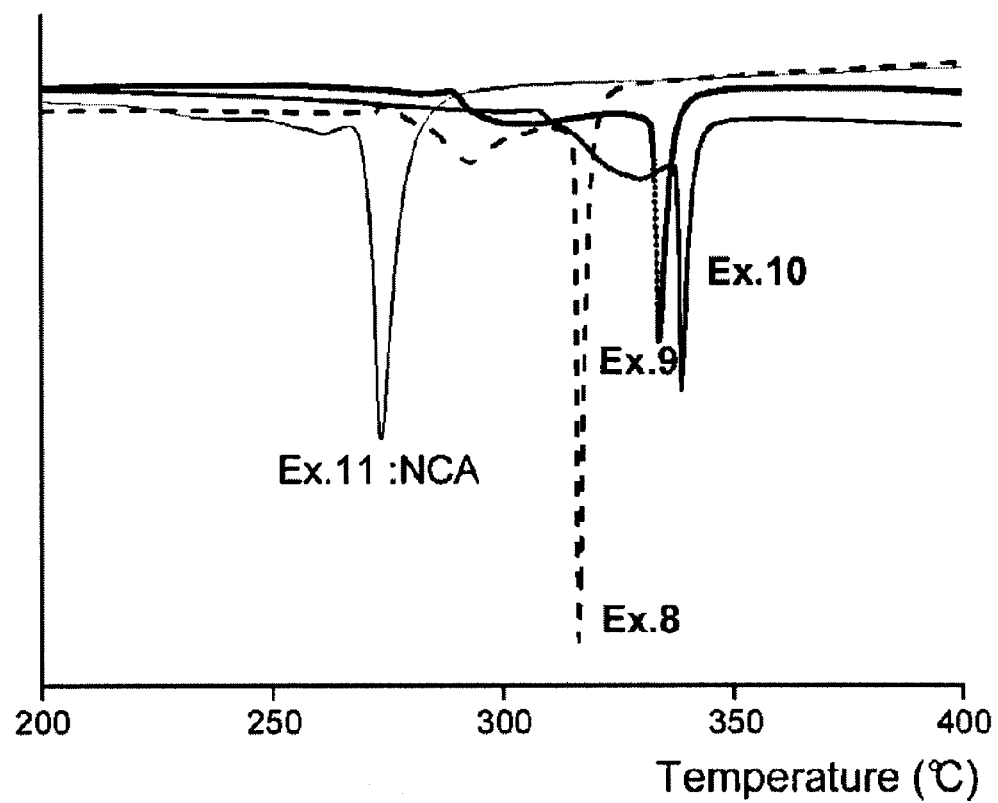

FIG. 5 illustrates the power measurement curves obtained during power tests (Peak Power Tests PPT) on 4/5 A format accumulators comprising a positive electrode comprising the compounds of Examples 7 and 11.
a) Discharging at 30° C., current peak (pulse) at the rate of 20 C for 18 s,
b) Charging at 30° C., current peak (pulse) at the rate of 9 C for 10 s,
c) Discharging at −20° C., current peak (pulse) at the rate of 9 C for 2 s.

FIG. 6 summarizes the synthesis and the physico-chemical properties of Example 5 (comparative) and shows SEM pictures of the compound of Example 5 for different conditions of synthesis.

FIG. 7 summarizes the synthesis and the physico-chemical properties of Example 6 and shows SEM pictures of the compound of Example 5 for different conditions of synthesis.

FIG. 8 summarizes the synthesis and the physico-chemical properties of Examples 2 and 3 and shows SEM pictures of the compounds of Examples 2 and 3 for different conditions of synthesis.

DETAILED DISCUSSION OF THE EMBODIMENTS

The invention relates to a lamellar material for a positive electrode. A lamellar material has a quasi two-dimensional structure with an alternation of $BO_2$ sheets (with rather covalent character) and of interlayer spaces $AO_2$ (of rather ionic character) with transition metals in majority in the sheets and lithium ions in the interlayer spaces. Ion diffusion mainly occurs within the interlayer spaces. The material of type $Li_{1+x}M_{1-x}O_2$, having the following characteristics:

a) M represents a quaternary composition in which each of the elements Ni, Mn, Co, and Al is present;

b) overlithiation, i.e. the compound has an excess number of moles of lithium relatively to the sum of the number of moles of nickel, cobalt, aluminum and manganese. The material is overlithiated in a specific range: the atomic ratio Li/M is comprised between 1.05 and 1.25, i.e. $1.05 \leq (1+x)/(1-x) \leq 1.25$. In an embodiment, the ratio Li/M is less than or equal to 1.15. In an embodiment, the ratio Li/M is less than or equal to 1.10.

c) the stoichiometric index of aluminum is larger than or equal to 0.015, preferably larger than or equal to 0.02, preferably larger than or equal to 0.04, still preferably larger than or equal to 0.09.

d) the atomic amount of manganese represents from 95% to 100% of the atomic amount of nickel, preferably it represents from 97% to 100% of the atomic amount of nickel, still preferably from 98% to 100% of the atomic amount of nickel.

The object of the invention is in particular a compound of the following general formula:

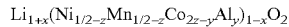

$$Li_{1+x}(Ni_{1/2-z}Mn_{1/2-z}Co_{2z-y}Al_y)_{1-x}O_2$$

wherein x, y and z satisfy the following relationships:
$1.05 \leq (1+x)/(1-x) \leq 1.25$; i.e. $1/41 \leq x \leq 1/9$;
$0 < z \leq 0.15$; and
$0.015 \leq y(1-x)$.

This compound is therefore characterized by:
a) the presence of elements Ni, Mn, Co and Al;
b) overlithiation relatively to the total amount of the elements Ni, Mn, Co and Al;
c) equality of the stoichiometric indices of nickel and of manganese;
d) a stoichiometric index of aluminum larger than or equal to 0.015.

Without having the intention of being bound by theory, the applicant believes that:

the presence of manganese and of aluminum imparts to the material better heat stability as compared with a compound only comprising the elements nickel-cobalt-aluminum (NCA). The presence of manganese and aluminum allows an increase of the temperature at which thermal runaway occurs. The material is therefore safer.

with the atomic amount of manganese representing from 95% to 100% of the atomic amount of nickel, it is possible to only have $Mn^{4+}$ ions and thereby avoid the presence of $Mn^{3+}$ ions. The presence of $Mn^{3+}$ ions is detrimental because it may cause possible dissolution of manganese into the electrolyte. Preferably, the concentration of $Mn^{3+}$ ions is less than 4000 ppm.

The concentration of $Mn^{3+}$ ions can be determined through a combination of chemical elementary analysis (determination of the total concentration of manganese in the sample) and oxidation-reduction titration (determination of the mean oxidation degree of manganese). Elementary analysis of the elements Ni, Mn, Co, Al and Li in the obtained compound may be accomplished by plasma optical emission spectrometry (ICP-OES).

Therefore the manganese deposit on the negative electrode is thereby minimized. With this, it is also possible to maximize the presence of $Ni^{2+}$ having a dual redox character ($Ni^{2+}$–$Ni^{3+}$–$Ni^{4+}$) in order to reduce the decrease in electrochemical capacity caused by the reduction of the amount of electrochemically active ions (nickel and cobalt) because of their partial substitution.

with overlithiation of the compound in a specific range corresponding to a overlithiation coefficient from 1.05-1.25, a homogenous phase without any impurities may be obtained. This induces a decrease in the nickel level in the interlayer lithium spaces, therefore good diffusivity of $Li^+$ ions and therefore good performances in terms of power.

The compound according to the invention may be made by following the following steps:

preparation of an aqueous solution of transition metal nitrates: Ni, Mn, Co and Al, in the desired proportions;

precipitation of the solution by adding $LiOH.H_2O$ and/or $NH_4OH$. A precipitate of transition metal hydroxide is then obtained.

evaporation and/or filtration of the obtained precipitate and drying in an oven (between 105 and 180° C.);

milling and possible addition of lithia;

precalcination between 480 and 500° C.;

calcination between 900 and 1,000° C.;

final milling.

Elementary analysis of the elements Ni, Mn, Co and Li in the obtained compound may be accomplished by plasma optical emission spectrometry (ICP-OES).

The thereby synthesized compound may be used as an electrochemically active material of a positive electrode of a lithium accumulator. This accumulator may be of the lithium ion or lithium polymer type. The applications which use this type of accumulator are portable electronic electric devices, electric vehicles, hybrid vehicles, space applications, telecommunications, emergency equipment.

EXAMPLES

Several compounds are made according to the synthesis method described earlier. The synthesized compounds are indicated in the Table 1 below.

TABLE 1

Tested compounds

| Example No. | a | b | c | y | x | z | $Ni_{a(1-x)}$ | $Mn_{b(1-x)}$ | $Co_{c(1-x)}$ | $Al_{y(1-x)}$ | $Li_{(1+x)}$ | Li/M $(1+x)/(1-x)$ |
|---|---|---|---|---|---|---|---|---|---|---|---|---|
| 1 | 0.40 | 0.40 | 0.20 | 0.00 | 0.038 | 0.1 | 0.385 | 0.3848 | 0.192 | — | 1.038 | 1.08 |

TABLE 1-continued

Tested compounds

| Example No. | a | b | c | y | x | z | $Ni_{a(1-x)}$ | $Mn_{b(1-x)}$ | $Co_{c(1-x)}$ | $Al_{y(1-x)}$ | $Li_{(1+x)}$ | Li/M $(1 + x)/(1 - x)$ |
|---|---|---|---|---|---|---|---|---|---|---|---|---|
| Comparative 2 | 0.40 | 0.40 | 0.18 | 0.02 | 0.038 | 0.1 | 0.385 | 0.385 | 0.173 | 0.019 | 1.038 | 1.08 |
| 3 | 0.40 | 0.40 | 0.15 | 0.05 | 0.038 | 0.1 | 0.385 | 0.385 | 0.144 | 0.048 | 1.038 | 1.08 |
| 4 | 0.40 | 0.40 | 0.10 | 0.10 | 0.038 | 0.1 | 0.385 | 0.385 | 0.096 | 0.096 | 1.038 | 1.08 |
| 5 | 0.425 | 0.425 | 0.10 | 0.05 | 0.099 | 0.075 | 0.421 | 0.421 | 0.099 | 0.096 | 1.099 | 1.02 |
| Comparative 6 | 0.40 | 0.40 | 0.10 | 0.10 | 0.061 | 0.1 | 0.376 | 0.376 | 0.094 | 0.096 | 1.061 | 1.13 |
| 7 | 0.40 | 0.40 | 0.15 | 0.05 | 0.107 | 0.1 | 0.357 | 0.357 | 0.134 | 0.048 | 1.107 | 1.24 |
| 8 | 0.425 | 0.425 | 0.15 | 0.00 | 0.024 | 0.075 | 0.415 | 0.415 | 0.146 | — | 1.024 | 1.05 |
| Comparative 9 | 0.425 | 0.425 | 0.10 | 0.05 | 0.024 | 0.075 | 0.415 | 0.415 | 0.098 | 0.048 | 1.024 | 1.05 |
| 10 | 0.425 | 0.425 | 0.05 | 0.10 | 0.024 | 0.075 | 0.415 | 0.415 | 0.049 | 0.096 | 1.024 | 1.05 |
| 11 Comparative | 0.80 | 0.00 | 0.15 | 0.05 | — | — | | | 0.048 | — | — | |

Improvement of the heat stability of the compounds according to the invention was able to be demonstrated by means of the Differential Scanning Calorimetry (DSC) technique. With this technique, it is possible to detect endothermal and exothermal effects which occur during changes of state of a material or a chemical reaction. It is used in the invention in order to measure the temperature at which the cathode active material undergoes decomposition. When the cathode active material is heated, its structure changes and transformations occur with heat exchange. In the present case, an exothermic reaction is observed between the oxygen released by the positive material and the electrolyte. A flow of evolved heat is recorded during the decomposition of the cathode material when a rise in temperature is applied to the latter. The DSC analysis gives information on the transformation temperature (endothermic or exothermic peak) and on the heat energy required for the transformation (area of the peak).

DSC measurements were conducted on non-washed positive electrodes each incorporating one of the compounds described in Table 1. The positive electrodes consist of the positive active material, of electronic conductors (carbon, soot . . . ) and of binder (polyvinylidene fluoride (PVDF), polytetrafluoroethylene (PTFE) . . . ). They were subject beforehand to a cycle (charge+discharge) and a charge. The cycling conditions were the following:

Voltage cycling limits 2-4.5 Volts, C/20 current discharge at room temperature. The results of the DSC measurements are indicated in Table 2.

TABLE 2

DSC measurement results

| Example | $T_{threshold}$ (° C.) | $T_{peak}$ (° C.) |
|---|---|---|
| 1 (comparative) | 253 | 288 |
| 3 | 300 | 338 |
| 4 | 300 | 352 |
| 6 | 272 | 342 |
| 7 | 280 | 320 |
| 8 (comparative) | 270 | 316 |
| 9 | 289 | 333 |
| 10 | 309 | 343 |
| 11 (comparative) | 200 | 275 |
| Example 6 of FR-A-2 860 922 $Li_{1.13}Ni_{0.35}Mn_{0.35}Co_{0.12}Al_{0.02}O_2$ (comparative) | Less than 259 | Less than 288 |

TABLE 2-continued

DSC measurement results

| Example | $T_{threshold}$ (° C.) | $T_{peak}$ (° C.) |
|---|---|---|
| Example 7 of FR-A-2 860 922 $Li_{1.13}Ni_{0.36}Mn_{0.33}Co_{0.13}Al_{0.05}O_2$ (comparative) | | 295 |

The compounds of comparative Examples 1, 8 and 11 have a DSC peak temperature of 288° C., 316° C. and 275° C. respectively. These temperatures are lower than the DSC temperatures of the Examples 3, 4, 6, 7, 9 and 10 according to the invention which have a DSC peak temperature comprised between 320 and 352° C. Now, the higher the DSC peak temperature, the better is the heat stability of the compound. The Examples according to the invention therefore have improved heat stability.

Figure 2:
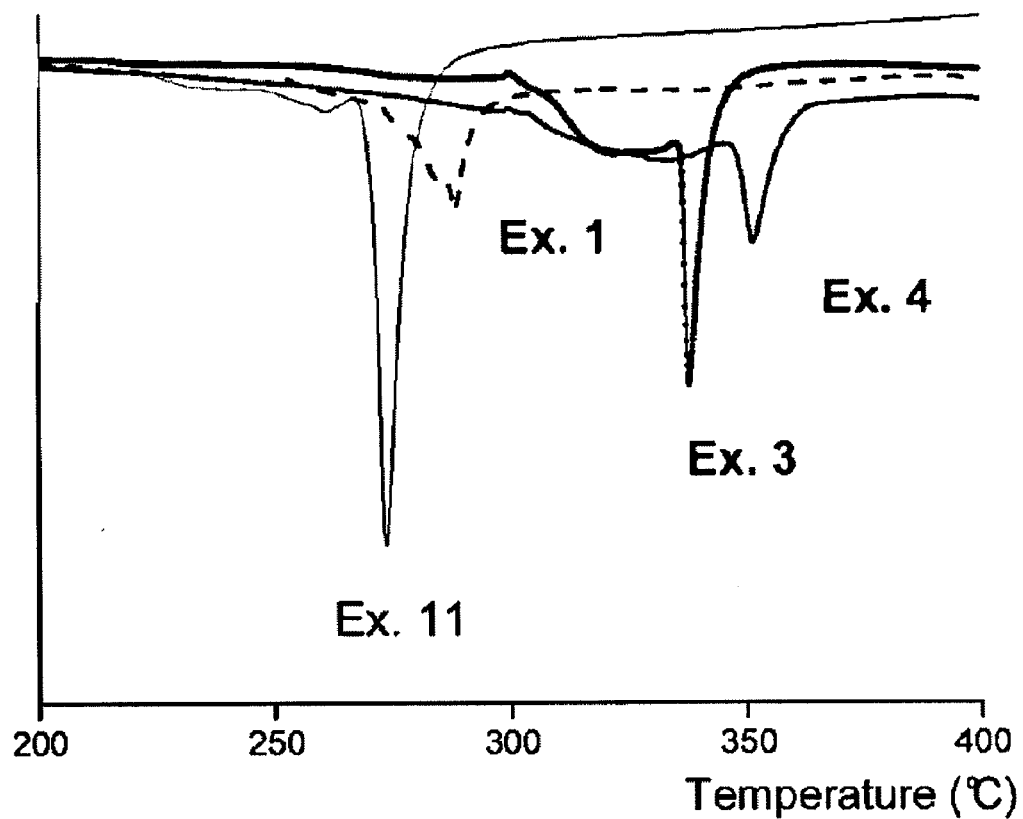

The results of Examples 9 and 10 according to the invention (FIG. 1), as compared with those of Example 8 which does not contain aluminum, show that heat stability is considerably improved by the presence of aluminum, the amounts of Mn and Ni being constant. Also, the results of Examples 3 and 4 according to the invention (FIG. 2), as compared with those of Example 1 not containing any aluminum, show that heat stability is considerably improved by the presence of aluminum, the amounts of Mn and Ni being constant. These results clearly show that with the presence of aluminum it is possible to obtain a higher heat runaway reaction temperature.

As a comparison, the DSC peak temperatures of Examples 6 and 7 from document FR-A-2 860 922 were measured. These temperatures are below the DSC peak temperatures of the examples according to the invention. Improvement of the heat stability of the examples according to the invention relatively to Examples 6 and 7 of document FR-A-2 860 922 is explained by the fact that according to the invention, the atomic amount of manganese represents from 95 to 100% of the atomic amount of nickel.

Surprisingly, the increase in heat stability of the compounds according to the invention does not occur to the detriment of their electrochemical capacity. Indeed, it would be expected that increasing the amount of aluminum in a compound would cause lowering of its electrochemical capacity. Indeed, part of the nickel and/or the cobalt is substituted with aluminum. A rise in the amount of aluminum therefore accompanies lowering of the amount of nickel and/or of cobalt. Now, only nickel and cobalt contribute to the electrochemical capacity of the compound. On the contrary, the electrochemical capacity of the compounds according to the invention is improved. Table 3 indicates the electrochemical capacity of the tested compounds. The capacity values are obtained during the electrochemical formation of the accumulators at 50° C. and at C/10.

TABLE 3

Electrochemical capacity of the tested compounds.

| Example | Total capacity (mAh/g) | $d_{ox}M1$* |
|---|---|---|
| Example 2 of FR-A-2 860 922 $Li_{1.07}Ni_{0.39}Mn_{0.39}Co_{0.14}Al_{0.01}O_2$ (comparative) | 171 at 4.3 V 160 at 4.2 V vs. Lithium i.e. 160 at 4.1 V vs. Graphite | 3.15 |
| Example 3 of FR-A-2 860 922 $Li_{1.09}Ni_{0.39}Mn_{0.38}Co_{0.13}Al_{0.01}O_2$ (comparative) | <167 at 4.1 V | |
| Example 7 $Li_{1.11}Ni_{0.36}Mn_{0.36}Co_{0.13}Al_{0.05}O_2$ | 171 at 4.1 V vs. Graphite | 3.25 |

*$d_{ox}M1$ designates the overall oxidation degree of $M_1$ wherein $M_1 = (Ni_aMn_bCo_cAl_y)_{1-x}$ The sum of the amounts of nickel and cobalt present in the Example 2 of FR-A-2 860 922 is 0.53 while it is only 0.49 for Example 7 according to the invention. It would therefore be expected that the compound of Example 2 of FR-A-2 860 922 would have an electrochemical capacity above the one of Example 7 according to the invention. Now surprisingly, as shown by Table 3, the electrochemical capacity measured for Example 7 according to the invention is 171 mAh/g at 4.1 V relatively to a graphite electrode, (which is equivalent to 4.2 V relatively to a lithium electrode), while the electrochemical capacity obtained with Example 2 of FR-A-2 860 922 is only 160 mAh/g at 4.1 V relatively to a graphite electrode. Table 3 therefore shows that the increase in aluminum content in Example 7 according to the invention relatively to the aluminum content of Example 2 of FR-A-2 860 922 did not have the effect of reducing electrochemical capacity. On the contrary, electrochemical capacity was increased by 6%. Also, the compound of Example 3 of FR-A-2 860 922 has a lower electrochemical capacity than the compound of Example 7 according to the invention.

FIGS. 6, 7 and 8 show the benefit of overlithiation on the structure of the compounds according to the invention. These figures summarize the data of the physico-chemical (and electrochemical if available) properties of Examples 5 (comparative) and 2-3, 6 according to the invention.

FIG. 6 shows different heat treatments used for making the compound of Example 5. Regardless of the treatment used, the compound of Example 5 has phase inhomogeneity. Impurities of the spinel type and/or a mixture of lamellar phases are detected by analysis with the X-ray diffraction technique (XRD). The table on FIG. 6 shows that for a rated ratio Li/(NiCoMnAl) equal to 1.02, the compound is heterogeneous with a distribution of phases being obtained while the lamellar phase is obtained pure when this ratio is equal to 1.08 (Examples 2 and 3, Table on FIG. 8) or 1.13 (Example 6, Table on FIG. 7). This is probably due to the fact that incorporation of aluminum into the structure requires a high calcination temperature, with an associated loss of lithium. With the X-ray diffraction technique it is therefore possible to determine whether the synthesized compound is pure. The absence of shoulders on the lines 003 and 104 indicates that a single lamellar phase was obtained and not a mixture of lamellar phases of close compositions. The absence of a line at the diffraction angle 2θ=32° (Cu, Kα) indicates the absence of any spinel phase.

Figure 3:
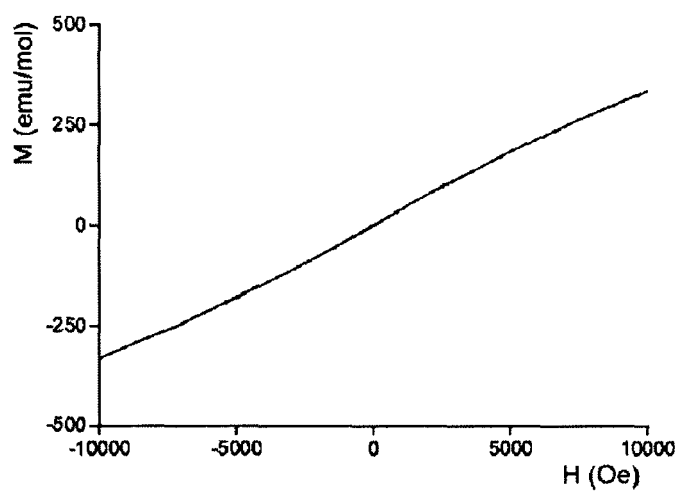
FIG. 3 illustrates the measurement of magnetization versus magnetic field at 5 K, associated with the results obtained by refinement by the Rietveld method of X-ray diffraction data (XRD) for example 7.
Figure 4:
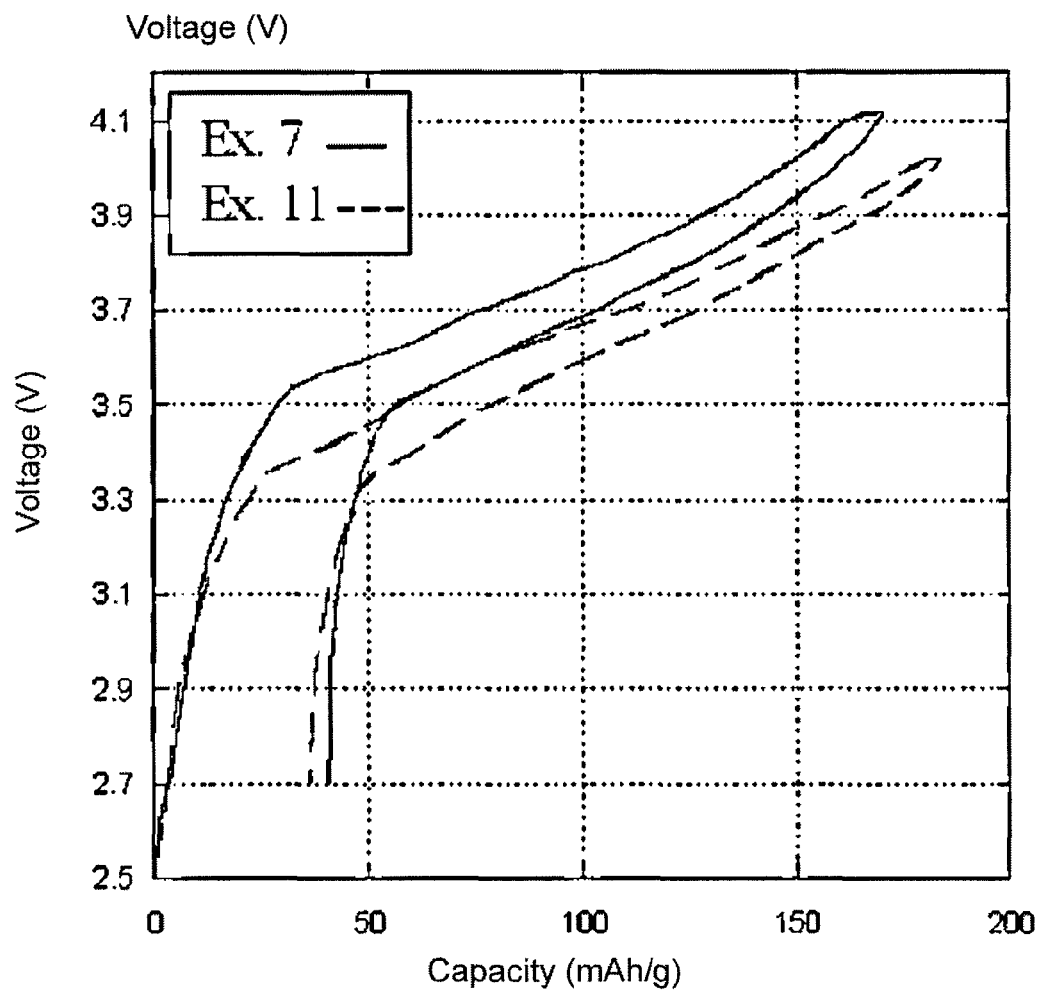
FIG. 4 illustrates the charging-discharging curve of the electrodes comprising the compounds of Examples 7 and 11. The values of the total electrochemical capacity obtained during the formation at 60° C. under a C/10 discharging rate for 4/5 A format accumulators, are inferred from these curves.
Figure 5B:
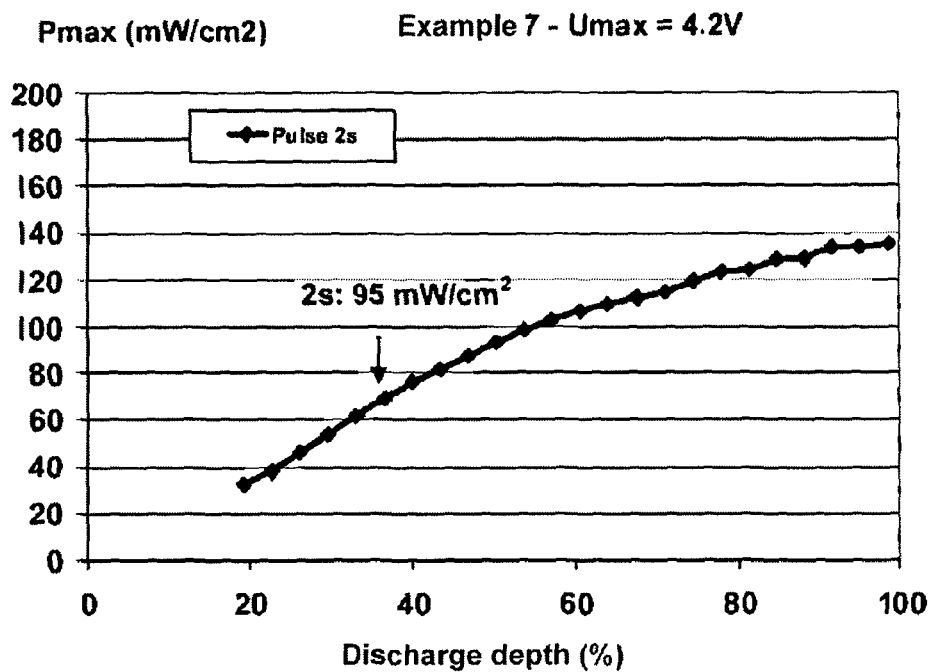
Figure 5B:
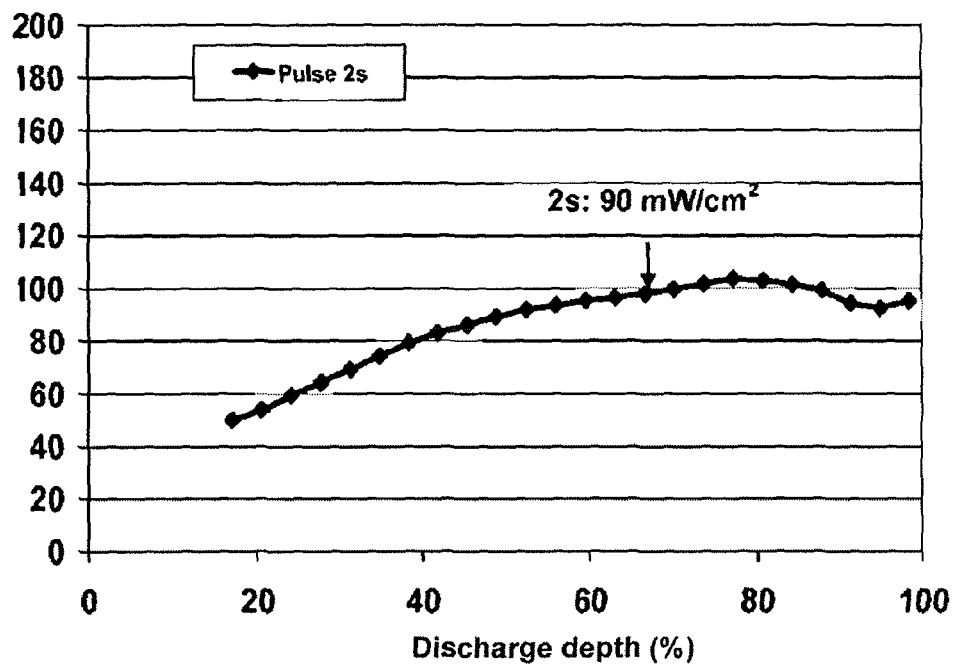
Figure 5C:
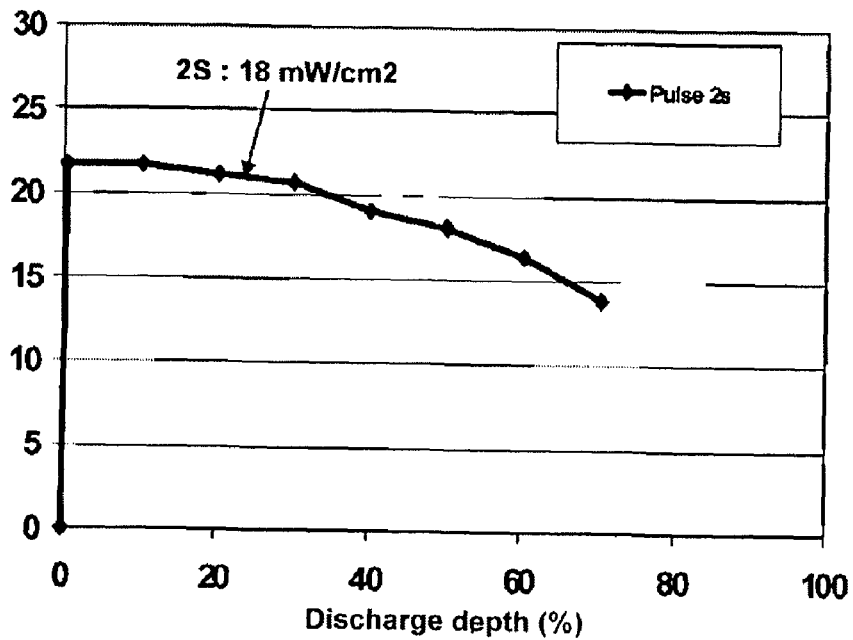
Figure 5C:
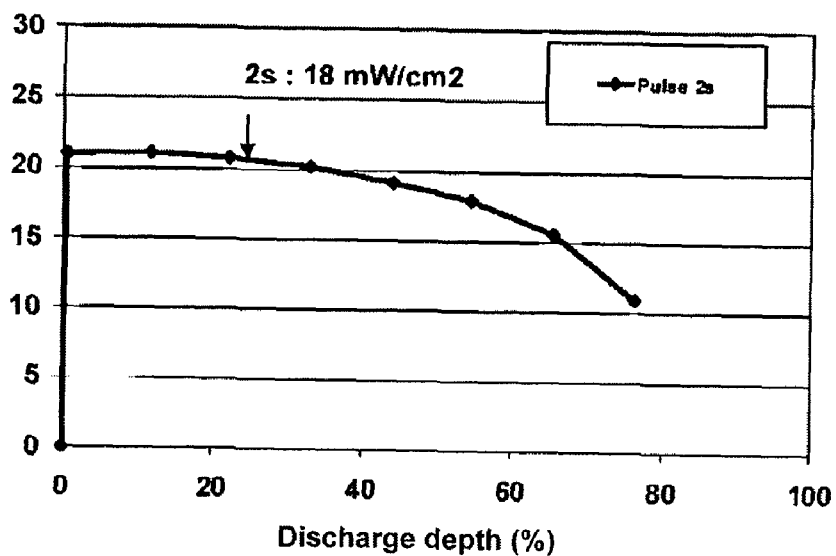

With overlithiation in a specific range it is possible to obtain reduced interlayer nickel levels, as shown by the magnetism results (FIG. 3) for Example 7 Li/(NiCoMnAl)=1.24. In this case, inexistent remanent magnetization at zero field (no hysteresis) demonstrates inexistence of ferromagnetic interactions, due to the strong nickel reduction in the interlayer space for this material which is confirmed by XRD analysis.

The detrimental effect of a low overlithiation level, i.e. less than 1.05, may be observed on power measurements carried out on small cylindrical elements with a 4/5A format, comprising:

a positive electrode consisting of the positive active material (Example 7 according to the invention and comparative Example 11), of electronic conductors (carbon, soot . . . ) and binder (PVDF, PTFE . . . );

an electrolyte consisting of lithium salt and of a mixture of alkyl carbonates;

a separator (for example in polyethylene or polypropylene);

a negative electrode consisting of graphite and of binders.

The power tests (Peak Power Tests, PPT) were carried out at 30° C. and at −20° C. during load and discharge (FIG. 5). Example 7 has better performances or at least as good as Example 11 which is an NCA material from the prior art.

As a summary, positive electrode materials, meeting the composition criteria described earlier, have good characteristics in terms of heat stability, while retaining or even improving power performances relatively to NCA. They may thereby be used in power application, for example for electric hybrid vehicles. The compounds according to the invention also have good compromise in terms of capacity and power.

Finally, the compounds according to the invention may be made at a low cost. Table 4 shows the calculation of the average costs of the metals (Ni, Co, Mn, Al) for each of the compositions listed in Table 1 (based on the prices of the London Metal Exchange May 2008). By reducing the Ni level (relatively to NCA) and the Co level (relatively to NMC=1:1:1) the average costs of metals are considerably reduced for these compositions, this apart from any cost related to the synthesis method used.

TABLE 7

Comparisons of the average costs of metals (USD/lb)(Co = 29, Ni = 12, Mn = 1.4, Al = 1.3 USD/lb).

| Example No. | Ni | Mn | Co | Al | Costs |
|---|---|---|---|---|---|
| 1 | 0.40 | 0.40 | 0.20 | 0.00 | 11.2 |
| 2 | 0.40 | 0.40 | 0.18 | 0.02 | 10.6 |
| 3 | 0.40 | 0.40 | 0.15 | 0.05 | 9.8 |
| 4 | 0.40 | 0.40 | 0.10 | 0.10 | 8.4 |
| 5 | 0.40 | 0.40 | 0.10 | 0.10 | 8.4 |
| 6 | 0.40 | 0.40 | 0.10 | 0.10 | 8.4 |
| 7 | 0.40 | 0.40 | 0.15 | 0.05 | 9.8 |
| 8 | 0.425 | 0.425 | 0.15 | 0.00 | 10.0 |
| 9 | 0.425 | 0.425 | 0.10 | 0.05 | 8.7 |
| 10 | 0.425 | 0.425 | 0.05 | 0.10 | 7.2 |
| 11 | 0.80 | 0.00 | 0.15 | 0.05 | 14.0 |

The invention claimed is:

1. A compound of formula $Li_{1+x}(Ni_aMn_bCo_cAl_y)_{1-x}O_2$ wherein:

a, b and c are non-zero;

a+b+c+y=1;

$1.05 \leq (1+x)/(1-x) \leq 1.25$;
$0.015 \leq y(1-x)$;
the atomic amount of manganese representing from 95% to 100% of the atomic amount of nickel.

2. The compound according to claim 1, wherein the amount of manganese represents from 97% to 100% of the amount of nickel.

3. The compound according to claim 1, wherein $0.02 \leq y(1-x)$.

4. The compound according to claim 1, wherein $0.04 \leq y(1-x)$.

5. The compound according to claim 1, wherein $0.09 \leq y(1-x)$.

6. The compound according to claim 1, wherein $1.05 \leq (1+x)/(1-x) \leq 1.15$.

7. The compound according to claim 1, wherein $1.05 \leq (1+x)/(1-x) \leq 1.10$.

8. The compound according to claim 1, wherein:
$a=b=0.5-z$;
$c=2z-y$; and
$0<z \leq 0.15$.

9. The compound according to claim 8, wherein $0<z \leq 0.10$.

10. The compound according to claim 9, wherein $0<z \leq 0.0075$.

11. The compound according to claim 1, devoid of $Mn^{3+}$ ions.

12. An electrode comprising the compound according to claim 1.

13. A lithium-ion or lithium-polymer electrochemical generator comprising an electrode according to claim 12.

14. The compound according to claim 2, wherein the amount of manganese preferably represents from 98% to 100% of the amount of nickel.

15. The compound according to claim 14, wherein the amount of manganese preferably represents from 99% to 100% of the nickel amount.

* * * * *